(12) United States Patent
Foster et al.

(10) Patent No.: US 8,936,676 B2
(45) Date of Patent: *Jan. 20, 2015

(54) COMPOSITIONS AND METHODS FOR COLORATION AND/OR STAINING OF GALVANIZED METAL SURFACES

(75) Inventors: Edward F. Foster, Palm Desert, CA (US); Thomas T. Yamashita, Denair, CA (US); Brian M. Hardin, Bermuda Dunes, CA (US)

(73) Assignee: Foster-Gardner, Inc., Coachella, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 13/249,834

(22) Filed: Sep. 30, 2011

(65) Prior Publication Data

US 2012/0076941 A1    Mar. 29, 2012

Related U.S. Application Data

(63) Continuation-in-part of application No. 12/370,493, filed on Feb. 12, 2009, now Pat. No. 8,075,684.

(60) Provisional application No. 61/028,987, filed on Feb. 15, 2008.

(51) Int. Cl.
| | | |
|---|---|---|
| C09D 5/00 | (2006.01) | |
| C09D 5/14 | (2006.01) | |
| C09D 105/00 | (2006.01) | |
| C04B 14/00 | (2006.01) | |
| C04B 16/00 | (2006.01) | |
| C04B 103/54 | (2006.01) | |
| C09B 67/00 | (2006.01) | |
| B05D 5/06 | (2006.01) | |
| C09D 199/00 | (2006.01) | |
| C09D 7/12 | (2006.01) | |
| C08K 3/08 | (2006.01) | |

(52) U.S. Cl.
CPC ............ *C09D 199/00* (2013.01); *C09D 7/1216* (2013.01); *C08K 3/08* (2013.01)
USPC .................. 106/501.1; 106/15.05; 106/18.32; 106/217.5; 106/217.6; 106/217.7; 106/217.9; 106/401; 106/419; 106/456; 106/459; 106/460; 106/461; 106/471; 106/480; 427/372.2; 427/379; 427/380; 427/384; 427/421.1; 427/422; 427/435

(58) Field of Classification Search
USPC .......... 106/15.05, 18.32, 217.5, 217.6, 217.7, 106/217.9, 401, 419, 456, 459, 460, 461, 106/471, 480, 499, 501, 505, 712, 501.1; 427/372.2, 379, 380, 384, 421.1, 422, 427/435
See application file for complete search history.

(56) References Cited

U.S. PATENT DOCUMENTS

| | | | |
|---|---|---|---|
| 333,457 | A | 12/1885 | Foster |
| 3,650,708 | A | 3/1972 | Gallagher |
| 3,955,018 | A | 5/1976 | Liberto et al. |
| 4,082,871 | A | 4/1978 | Peters |
| 4,725,451 | A | 2/1988 | Cripe |
| 4,812,340 | A | 3/1989 | Cripe |
| 5,308,646 | A | 5/1994 | Moore |
| 8,075,684 | B2 * | 12/2011 | Foster et al. ............... 106/501.1 |
| 2009/0078014 | A1 | 3/2009 | Yamashita |

\* cited by examiner

*Primary Examiner* — Anthony J Green
(74) *Attorney, Agent, or Firm* — Myers Andras LLP; Joseph C. Andras

(57) ABSTRACT

An aqueous liquid solution containing soluble salts of coloring metals—particularly manganese and ferric iron along with a sugar source and fulvic and/or humic acid can be readily applied to galvanized metal surfaces impart a natural color tone to such surfaces. In this manner the visibility manmade structures like fences and guardrails is quickly and easily reduced and readily blended into the natural background. The liquid solution can be readily sprayed on galvanized surfaces. When the ambient temperature is warm natural color will develop two-three weeks.

19 Claims, No Drawings

COMPOSITIONS AND METHODS FOR COLORATION AND/OR STAINING OF GALVANIZED METAL SURFACES

CROSS-REFERENCE TO PRIOR APPLICATIONS

The present application is a continuation-in-part of and claims the benefit of U.S. non-provisional application Ser. No. 12/370,493, filed on Feb. 12, 2009, now issued as U.S. Pat. No. 8,075,684, which claims the benefit of U.S. provisional application No. 61/028,987, filed on Feb. 15, 2008.

U.S. GOVERNMENT SUPPORT

Not applicable.

BACKGROUND OF THE INVENTION

1. Area of the Art

The present application is in the art of landscaping and is directed to a product and method for making galvanized metal structures blend into the surrounding terrain.

2. Description of the Background Art

New construction particularly when exposed rock and soil surfaces are altered often fails to harmonize with the surrounding terrain because altered surfaces are colored differently than the native surfaces. When the construction contains concrete and metal (iron and steel) components, the new concrete and metal may also present a harsh appearance in spite of the use of concrete coloring agents and metal covering paints. These problems are exacerbated in relatively arid regions like the Southwestern portion of the United States both because the aridity slows the growth of natural vegetation that will in time cover the altered surfaces, and because in relatively arid regions rock surfaces are naturally covered with "desert varnish" a coating that is often much different in color than the "naked" rock surface. The presence of the "desert varnish" makes any alteration to the rock surface that much more obvious.

Because natural coloration to rock surfaces such as "desert varnish" develops slowly over a period of years or even decades or longer, there have been efforts to apply materials to more rapidly mask alteration to the surface so that new construction can more rapidly blend in. The most commonly used approach has been to apply coloring liquids not unlike paints or stains used on wood. Commercially available formulations of paint-like materials available for coloring rock surfaces tend to be superficial and, thus, are readily weathered, commonly fading within as little as a few months. Such liquids gain most of their tinting or coloring power from blending a dye or pigment into a liquid carrier or vehicle such as latex, oil or organic solvent. With even minimal weathering from ambient sunlight, wind or rain such a superficial coating may readily slough from the treated surface and/or the pigments may fade or change hue. Further, because the coloring agent's primary means of attachment to the rock or other surface relies almost entirely upon surface adhesion, the bond between the color and the surface is at best weak and lacks the permanence that is desired.

There have been attempts to more closely replicate naturally developed surface coloration. U.S. Pat. Nos. 4,725,451 and 4,812,340 to Cripe describe a method of simulating "desert varnish" by first reacting the rock surface with a liquid alkali base and then applying a coloring layer of a metallic salts such as iron or manganese salts. U.S. Pat. No. 5,308,646 to Moore discloses a method of applying metal acetate salts to rock surfaces to mimic "desert varnish." This reference particularly prefers the application of iron acetate and manganese acetate. Iron salts are known to impart reddish "rust" colors when they become oxidized. Manganese oxide is black/purple and is believed to be a principle coloring agent in natural "desert varnish." Recent research has confirmed the presence of manganese in "desert varnish" but has also surprisingly revealed that a major constituent of natural "desert varnish" is clay powder apparently from a wind blown source. It is also known that lithophilic bacteria inhabit the surface layers of rocks are at least partially responsible for the process that binds the clay particles and oxidizes the manganese ions to form natural "desert varnish."

SUMMARY OF THE INVENTION

Natural surfaces can be imparted with a natural color by utilizing metallic coloring agents to create a chemical bond between substrate rock, soil, concrete or metal and the coloring agent. The strength and permanence of the bond is improved by selecting forms of the coloring agent from various soluble and reactive salts of color generating elements such as nitrate salts. The parent application of this application was primarily direct towards coloring rock (including concrete) surfaces although use of the formulation on metallic surfaces was contemplated. The present invention is a refinement of the original formula that is particularly effective in coloring galvanized metal (usually steel) surfaces. In addition, methods for achieving optimum results in coloring galvanized surfaces have been developed.

Salts of pigment forming elements such as iron, copper, cobalt and manganese are advantageously used. A large number of other color or pigment producing metals such as "rare earths" elements and can be used. Salts that are oxidizing agents appear to contribute to a bond between coloring agent (metal atom) and substrate increasing tenaciousness and resulting in greater permanence. The final shades and hues of pigmentation visible to the human eye result from an interaction between the substrate (possibly by means of an oxidizing event) and the coloring metal atoms.

Some of the soluble organic compounds used with the metallic coloring agents are complexing agents such as fulvic acid, ulmic acid, citric acid, malic acid, etc). These agents chelate and complex the metal ions to enhance their solubility beyond that provided by anions (as explained below). In particular fulvic and ulmic acids which are complex humic substances have color of their own and also serve as binding materials that can help immobilize the color-forming metal ions.

The basic formula contains an effective concentration of soluble salts of color producing metals. Iron and manganese salts are particularly preferred and an effective formula should contain at least one of these metals. The preferred anion is nitrate but other soluble anions as mentioned herein can be used. A soluble anion that is an oxidizer is preferred. The soluble metal ions are combined with an organic sugar energy source. The preferred material is high fructose corn syrup although glucose syrup or sucrose solutions are also effective. The choice of type of sugar is largely economic although high fructose syrup and sucrose syrup tend to have a lower viscosity (favorable characteristic) than glucose syrup.

At least one organic complexing agent is also required in the formula. The favored agents are fulvic acid and humic acid. For a single complexing agent fulvic acid is preferred. A variety of trace elements are preferably included to promote growth of organisms, and humic acid also serves as a trace element source. In addition, a preservative is added because of the large amount of sugar. Propionic acid is a preferred preservative. In modifying the original formula to achieve optimal results with galvanized metal surfaces increasing the concentration of certain metallic ion coloring agents—namely manganese and ferric iron—and of fulvic acid has proven particularly effective.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved formula for producing natural "aged" coloration to unpainted galvanized metal surfaces.

The present invention utilizes the chemical activity of metallic coloring agents to create a chemical bond between substrate rock, soil, concrete or metal and the coloring agent. The strength and permanence of the bond is improved by selecting forms of the coloring agent from various soluble and reactive salts of color generating elements. Examples of these soluble salts are primarily nitrates and chlorides although other soluble anions such as chlorates are useful as well. The effective salts are those of metallic pigment elements such as cobalt (e.g., cobaltous chloride), copper (e.g., copper nitrate), iron (e.g., ferric nitrate) and manganese (e.g., potassium permanganate, manganese nitrate).

A large number of other color or pigment producing metals also exist—many of them being "rare earths" elements and can be used in the general formula given below. Many of these compounds are oxidizing agents and such materials appear to contribute to a bond between coloring agent (metal atom) and substrate increasing tenaciousness and resulting in greater permanence. The final shades and hues of pigmentation visible to the human eye result from an interaction between the substrate (possibly by means of an oxidizing event) and the coloring metal atoms. Thus, because of the often, inhomogeneous make-up of the substrate rock, the final outcome will demonstrate highly variable shades and hues with a depth of variation, creating a product of non-repetitive, surprisingly beautiful and natural looking outcome. In the case of galvanized metal such as guard rails or fences, the newly installed metal has a bright, silvery appearance that really stands out. Left to its own devices the shiny zinc will eventually develop a coating of zinc oxide so that the metal will lose much of its shine. However, the color remains light and does not blend harmoniously with natural scenes. In a proper formulation the pigment producing metals will develop a warm brownish color on a galvanized surface. Such a color helps blend the galvanized surface into the natural background.

The primary aim of these unique formulations for rock and surface coloration is to permeate 1-10 mm or more into the surface of the target object (usually rock or concrete—i.e., artificial rock). In the case of a metal surface, penetration is necessarily less.

High solubility of the staining compounds is an important requirement. For example, the cold water solubility of Ca $(NO_3)_2$ is equivalent to >10,000 lbs in 500 gallons of water at 65° F. (or >2.4 Molar solution). Other nitrate salts tend to have high solubilities. High solubility ensures that the active materials are able to penetrate relatively deeply into the rock (or other substrate). To create also subtle to distinct variations in staining, we have, in most formulations, included various carbohydrates, amino acids, proteins and other carbon-hydrogen-oxygen containing materials. These materials works in at least two ways. First, the presence of organic material provides nourishment for various species of "epiphytes" (organisms which live on the surface of the substrate). For example, we have demonstrated that a spray containing these agents enhances bloom of various algal and lichen species. Such a bloom always adds another dimension of artistry to the overall staining effect since the algae and lichens are colored themselves. In addition, the organic materials support the growth of lithophilic bacteria which live both on and within the surface layers of the substrate. All of these living organisms tend to secrete compounds that digest or alter the rock surface—thereby enhancing the ability of the staining compounds to penetrate. Second, the organic materials secreted by bacteria can act as vehicles to bind the coloring agents within the substrate. Organic compounds in the stain solution act in a similar fashion to form a precipitate or vehicle that further binds the coloring agents. This is particularly important in creating a coating on a metal surface where penetration is necessarily extremely limited.

Some of the soluble organic compounds used with the metallic coloring agents are complexing agents such as "humic acids, fulvic acid, ulmic acid, citric acid, malic acid, etc.). These agents chelate and complex the metal ions to enhance their solubility beyond that provided by anions. In particular fulvic and ulmic acids which are complex humic substances have color of their own and also serve as binding materials that can help immobilize the color-forming metal ions.

To better appreciate the importance of the solubility of the metal ion coloring agents, an extremely soluble substance, calcium nitrate, will be used as an example. It will be apparent to one of skill in the art that calcium ions are not normally considered to be color formers. However, calcium nitrate is extremely soluble thereby permitting penetration into the surface of the substrate. After the calcium ions penetrate, they can be rendered insoluble and the matrix formed by insoluble calcium ions can help bind other metals which are direct color formers. The steps of the process are as follow:

1. 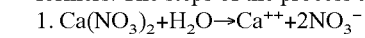 $Ca(NO_3)_2 + H_2O \rightarrow Ca^{++} + 2NO_3^-$

The strong oxidizing power of the nitrate group helps ensure that calcium is in a cationic form.

2. 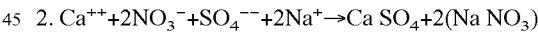 $Ca^{++} + 2NO_3^- + SO_4^{--} + 2Na^+ \rightarrow CaSO_4 + 2(NaNO_3)$ When the solution is sprayed onto a surface, the high solubility of the compounds helps to keep them in a reactive, ionic form. This, then allows the sulfate anion of sodium sulfate (in this example) to interact with the calcium ions to form the relatively insoluble calcium sulfate. The results are shown here as sodium nitrate, but that salt is actually quite soluble and would most likely be leached away by precipitation or ground water. Although calcium does not provide color, inclusion of soluble calcium salts (about 0.05M to about 0.5M) can result in formation of an insoluble matrix that helps trap color forming agents. Similar precipitation will occur if other less soluble anions (such as $CO_3^{--}$) interact with the cations.

Also, many of the color forming metal ions will be precipitated or rendered insoluble by a redox reaction. For example, the permanganate ion ($MnO^{4-}$) is quite soluble, but if this group is reduced (gains electrons) by interaction with organic matter or bacterial electron transport, it can be converted to insoluble manganese dioxide (which is black in color). Similar redox reactions can result in precipitation of other color forming metal ions. Thus, the addition of various organic compounds to the mixture enhances color formation by promoting bacterial growth which leads to reduction of color forming metal ions and by direct redox reactions of the color forming metal ions.

Additional coloring can be achieved through mixing the components and varying the concentration of the spray solution. Spraying the target rocks, metal or concrete at varying temperatures yields variations in the absolute color and intensity of the color effects. Another very important factor in the spray design allows the spray to thoroughly wet the target surface.

The basic formula contains an effective concentration of soluble salts of color producing metals. Iron and manganese salts are particularly preferred and an effective formula should contain at least one of these metals. The preferred anion is nitrate but other soluble anions as mentioned herein can be used. A soluble anion that is an oxidizer is preferred. The soluble metal ions are combined with an organic sugar energy source. The preferred material is high fructose corn syrup although glucose syrup or sucrose solutions are also effective. The choice of type of sugar is largely economic although high fructose syrup and sucrose syrup tend to have a lower viscosity (favorable characteristic) than glucose syrup. It is believe that the major function of the sugar energy source is to support the growth of microorganisms that promote the oxidation and coloration. However, the sugars may also function directly in the chemical reactions. At least one organic complexing agent is also required in the formula. The favored agents are fulvic acid and humic acid (humic acid or humic materials is often a catchall term which includes fulvic and ulmic acid as well as other compounds). The mineral Leonardite is a humic mineral that is the source of trace elements as well as humic acid type materials. For a single complexing agent fulvic acid is preferred. A variety of trace elements are preferably included to promote growth of organisms, and humic acid also serves as a trace element source. In addition, a preservative is added because of the large amount of sugar. Propionic acid is a preferred preservative.

A typical formula might contain 0.4M Magnesium, 0.2M Zinc, 0.4M Manganese, 0.3M Iron, 0.04M Copper, 0.008M Cobalt, 0.003M Molybdenum, and 0.02M Boron as well as other active ingredients as shown in the table. However, as indicated in Table 1, below, there can be a considerable effective range of some of the ingredients. This formula can be used either undiluted or diluted as much as 1 part in 40 parts water depending on the color intensity of the desired results.

TABLE 1

| Ingredient | Typical Range (Molarity or amount per 100 gallons) | Comments |
| --- | --- | --- |
| Water | Sufficient to make 100 gallons | (The target water to total volume is between 1:3 and 1:4) |
| Propionic Acid | 0.0003M-0.0015M | Preservative and extracts micronutrients |
| Humic Acid (Leonardite) [micro-nutrient source] | 0.5-5.0 lbs | Complexing/chelating and provides a variety of trace elements |
| 85% Fructose (High Fructose Corn Syrup) | 0.5-10 gallons | Promotes growth of epiphytic algae, bacteria and lichens |
| 2% Fulvic Acid Solution | 2.5-20 gallons | Complexing/chelating agent and trace elements |
| Magnesium Nitrate | 0.05M-0.55M | Contributes to growth of microorganisms |
| Zinc Nitrate (Solution) | 0.0026M-0.52M | Imparts strong oxidation of rock-contained ligands; brownish coloration |
| Manganese Nitrate (Solution) | 0.02M-0.5M | Oxidizer and source of purple-black coloration |
| Ferric Nitrate (Solution) | 0.02M-0.5M | Oxidizer and source of red-brown coloration |
| Cuprous Nitrate (Solution) | 0.008M-0.08M | Oxidizer and source of blue-green coloration |
| Cobalt Nitrate | 0.003M-0.05M | Oxidizer and source of red coloration |
| Sodium Molybdate | 0.0015M-0.025M | Essential nutrient for epiphytes; orange-yellow coloration |
| Sodium Tetraborate | 0.002M-0.03M | Essential nutrient for epiphytes |

Directions for mixing a 100 gallon batch:

1. Fill a holding tank or barrel with the required amount of Propionic Acid+40 gal water and soak the humic acid micronutrients (crumbled to 20-mesh or less particles) to extract essential micro-nutrients. A painter's filter sack can be used as a "tea bag" to contain the humic acid for extraction.

2. Fill the mix tank with 180 gal warm water (approximately 85-115° F.)+the required amount of Fulvic Acid solution and blend thoroughly with agitators running before adding the solution from step 1.

3. Gradually blend in: Magnesium Nitrate (as a stock solution), Zinc Nitrate (as a stock solution, Manganese Nitrate (as a stock solution, Ferric Nitrate (as a stock solution), Cuprous Nitrate (as a stock solution) and continue to homogenize thoroughly.

4. Gradually add the Cobalt Nitrate solid and dissolve completely, then follow the Sodium Molybdate solid and add Sodium Tetraborate solid last. Continue to agitate and blend until all materials are in solution. Gradually add the required amount of high fructose corn syrup and blend thoroughly. Add water until target volume of 100 gallons is reached.

5. Filter through 400 mesh screen and store in a tote until bottled.

The propionic acid is a preservative to prevent growth of microbes during storage as well as an agent to extract micronutrients. Other preservatives such as benzoic acid, citric acid or sorbic acid can be used; citric acid also acts as a complexing agent. However, because part of the goal of the material is to promote bacterial, algal and fungal growth on the substrate to be colored, strong biocides should be avoided. Humic acid micronutrients serve to supply micronutrients for promoting biological growth. In addition, the humic acid is a chelator and organic binding agent (i.e., contributes to an insoluble matrix). Fulvic acid serves a similar purpose. Magnesium nitrate and sodium tetraborate are nutrient compounds with oxidative properties. Although inherently colorless they can contribute to the precipitated matrix material to trap the colored metallic elements. Zinc nitrate contributes to brownish tones; manganese nitrate contributes to purple and black tones; ferric nitrate contributes reddish or brownish tones; cuprous nitrate contributes to bluish and greenish tones; cobalt nitrate provides reddish tones; and sodium molybdate provides orange and yellowish tones. It will be apparent that the exact proportion of the coloring agents can be varied to better match certain types of native rocks or soils. This mixture is a good general purpose stain for a variety of normal rock tones.

Besides the major coloring agents mentioned above, a large number of other metal ions can be included for special purposes as long as the oxidizer/organic energy source/fulvic acid scheme is followed. In particular, small quantities of soluble rare earth elements (elements from the Lanthanide and Actinide series) can be added to modulate the color. Since these elements are expensive and in some cases toxic, they should be used judiciously.

Application to Surfaces:

Depending on quantities of material to be applied and type of surface area to be treated, i.e. rock, concrete, or steel various application devices can be used. For example, a commercial type hand held or backpack sprayer (1-3 gal capacity) can be used for smaller areas (up to about 1,000 square feet). Also, smaller more controlled applications for example, (naked or untreated) rock that is positioned next to decorative stone that is not to be treated can be done with paint brushes and sponge brushes of all sizes. This provides more detailed control when applying material to the surface to be treated without the having danger of overspray or drift (typical from a spray device) that might cause material to be applied on surfaces that were not intended to be treated. Taping off (masking) areas not to be treated is also an option but is cumbersome and increases overall application time.

When applying the material (with any of the application methods) the applicator generously and completely covers the surface to be treated. Runoff may occur and can be evened out with either a sponge or terry cloth rag. Blending and soaking the excess material evenly will eliminate color runs that might develop and look unnatural.

Color Transition and Development:

During the warm summer months initial color cure time will normally take 4-8 days depending on sunlight and heat intensity. Cold winter months typically take at least twice as long, about 10-20 days or more depending again on sunlight and heat intensity. If rain falls or other water intrusion, i.e. irrigation, water truck, etc. occurs during this process it may prolong the color development time or even necessitate reapplication of the product to reach target color. During color transition and development the active ingredients penetrate into the rock surface where chemical and biological reactions cause the color to develop and become fixed in place.

The precise color characteristics depend on the types and amounts of metal ions used. The following description is based on the example formula given above. The final color hue reached is dependent on surface type, but typically immediately after applying the material a yellowish orange will appear for a few days depending on time of year. After a period of days the surface color will then transition from a yellowish to orangey rust color and remain like that for a few more days. The final color transition is from orangey rust to earth tone browns, light, medium, and dark depending on the concentration of the initial application.

Formulations for Galvanized Metal

A number of experiments have been carried out concerning coloring galvanized metal (generally steel). It was discovered that the original formula described above has some power to color galvanized surfaces. In a way this is somewhat surprising. The ability of the formula to color iron or steel directly is not so surprising because the formula might be expected to promote surface oxidation. However, while the formula can impart iron or steel surfaces with a brown color, this does not appear to be rust or at least not entirely rust. One would expect, however, that a galvanized surface would avoid oxidation—at least of the type that would impart surface color. However, the formula is able to impart a brownish tone even to galvanized surfaces. It has been discovered that the ability to color galvanized surfaces can be significantly enhanced by increasing the amount of manganese and ferric iron as compared to a formula optimized for coloring rock surfaces.

For example, Table 2, below, compares the amounts of some key active ingredients of a formula optimized for use on rocks with one optimized for coloring galvanized metal. It should be noted manganese is significant increased, and iron is increased somewhat. The ratio between iron and manganese is adjusted to obtain the desired final color. Iron favors red/red-orange tone while manganese favors gray/black tone. The illustrated formula produces a fairly dark neutral brown color. Zinc, copper, boron, cobalt and molybdenum are at lower concentrations in the galvanized metal formula. This is a result of dilution from adding manganese and iron (and fulvic acid, see below) to the original formula. There is no evidence that increasing or decreasing the concentration of these ingredients either helps or hinders coloring galvanized metal. The other ingredients (as listed in Table 1) remain the same between the two formulae except for the dilution effect noted. However, the amount of fulvic acid is significantly increased to at least twice that of the rock staining formula. It appears that increased fulvic acid contributes to the more rapid formulation of a colored film on the galvanized metal. This material was produced by taking 62.5 gallons of the original rock formula and adding to it 50 gallons of 10% ferric nitrate, 125 gallons of 12% manganese nitrate solution and 12.5 gallons of 2% fulvic acid solution.

TABLE 2 comparison of galvanized metal and rock staining formulae:

| Ingredient | Rock Formula | Galvanized Metal Formula |
|---|---|---|
| Magnesium | 0.5% | 0.125% |
| Manganese | 1.75% | 3.0% |
| Zinc | 0.75% | 0.2% |
| Iron | 1.1% | 1.25% |
| Copper | 0.125% | 0.032% |
| Boron | 0.01% | 0.003% |
| Cobalt | 0.025% | 0.007% |
| Molybdenum | 0.015% | 0.00375 |

Application of the Galvanized Metal Formula

The galvanized metal formula can be applied by spraying the liquid to metal structures (e.g., guard rail or fencing) in situ. However, it there must be 3-6 weeks of warm, dry weather for optimal color to develop. As might be expected, application to metal surfaces is particularly vulnerable to rain which simply washes the formula off before it is cured. When curing is complete, the color is present as a durable surface layer. While strong abrasion can remove the color and expose the underlying metal, simple rubbing or contact will not disturb the color.

In view of the vulnerability to weather, experiments were undertaken to explore ways to accelerate the curing of the color. In rock applications, it is believed that both temperature and exposure to light play roles in the development of the color. However, with application to galvanized metal, it appears that temperature is more critical. In one set of experiments galvanized metal samples were dipped into the formula for times ranging from 5 to 30 minutes. The dipped metal was allowed to drip dry and then was baked in an oven at temperatures ranging from 250-350° F. for times ranging from 20 minutes to one hour. All of these treatments produced a nice color equivalent to at least a two week outside curing during warm, dry summer weather. After this treatment, the coating was weather proof. However, baking in a 150° F. oven for this amount of time produced a somewhat lighter color that was judged as suboptimum. It is not know if longer baking at 150° F. would obviate this problem. It does appear as if optimum processing (relatively short time at the lowest possible temperatures) is achieved at oven temperatures between about 250-350° F. Higher temperatures do not appear to improve results. Clearly, light is not required for color production on metal surfaces.

Another approach is to quench the hot metal immediately as it leaves the galvanizing "bath" (molten zinc) at about 700° F. However, this did not result in adequate color development. Either the quenched metal cools below the critical temperature too rapidly, or drying is a necessary part of color development. Soaking the metal in a bath of heated formula does, however, result in relatively good color development suggesting that drying is not always necessary. The soaking experiments were carried out at bath temperatures between 110-130° F. It is thought that slightly lower temperature (e.g., 100° F.) may somewhat be effective, but at temperatures of 130° F. and above the stability of the formula in the bath is impaired (e.g., precipitation occurs). It appears that higher application temperatures result in better color, but bath stability is limiting. It is also possible to apply a hot spray using a device that heats the formula as it is sprayed to avoid the stability issues. Also, it seems likely that combinations of hot spray and oven baking may produce optimum results. Baking with or without hot spray application is favored in a factory setting where the items are colored before installation. Hot spraying is favored for in situ application where the spraying might also be combined with heat guns or hot air blowers to result in rapid setting and coloring of the applied material.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. An aqueous liquid for application to galvanized metal surfaces to impart a natural and substantially permanent coloration to the surfaces, the aqueous liquid comprising:
    between about 0.04M and 1.0M primary coloring metal ions selected from the group consisting of ferric iron, manganese and mixtures thereof wherein the iron comprises more than 1.1% by weight and the manganese comprises more than 1.8% by weight;
    between about 0.4% by weight and 8.5% by weight of a sugar selected from the group consisting of high fructose corn syrup, glucose, sucrose and mixtures thereof
    between about 0.0006% by weight and 0.4% by weight of an organic complexing-matrix agent selected from humic acid, ulmic acid and mixtures thereof;
    between about 0.05% by weight and 0.4% by weight of fulvic acid;
    a preservative; and
    water.

2. The aqueous liquid according to claim 1 further comprising secondary coloring metal salts selected from the group consisting of water soluble salts of zinc, copper, cobalt, molybdenum, lanthanides, actinides and mixtures thereof.

3. The aqueous liquid according to claim 1 further comprising between about 0.05M and 0.55M of magnesium nitrate.

4. The aqueous liquid according to claim 1, wherein the preservative is selected from propionic acid, benzoic acid, citric acid, sorbic acid and mixtures thereof.

5. The aqueous liquid according to claim 1 further comprising between about 0.05M and about 0.5M of calcium nitrate.

6. The aqueous liquid according to claim 4, wherein the preservative comprises between about 0.0003M and 0.0015M propionic acid.

7. The aqueous liquid according to claim 1 further comprising minor growth factors selected from soluble forms of magnesium, molybdenum and boron.

8. An aqueous liquid for application to galvanized metal surfaces to impart a natural and substantially permanent coloration to the surfaces, the aqueous liquid comprising:
    at least about 1.1% by weight ferric nitrate;
    at least about 1.8% by weight manganese nitrate;
    between about 0.002M and 0.5M of secondary coloring metal ions;
    between about 0.4% by weight and 8.5% by weight of a sugar selected from the group consisting of high fructose corn syrup, glucose, sucrose and mixtures thereof;
    between about 0.004% by weight and 0.4% by weight of an organic complexing-matrix agent selected from humic acid, ulmic acid, fulvic acid and mixtures thereof;
    between about 0.003M and 0.0015M propionic acid; and
    water.

9. The aqueous liquid according to claim 8 further comprising secondary coloring metal ions selected from the group comprising zinc ions, copper ions, cobalt ions and mixtures thereof.

10. The aqueous liquid according to claim 9, wherein the secondary coloring metal ions further comprise water soluble lanthanides, actinides and mixtures thereof.

11. The aqueous liquid according to claim 8, wherein the soluble source of boron is between about 0.002M and 0.03M sodium tetraborate.

12. The aqueous liquid according to claim 8 further comprising between about 0.05M and about 0.5M of calcium nitrate.

13. A method for imparting color to galvanized metal surfaces comprising the steps of:
    applying an aqueous liquid to the surfaces wherein the aqueous liquid comprises:
        between about 0.04M and 1.0M primary coloring metal ions selected from the group consisting of ferric iron, manganese and mixtures thereof wherein the iron comprises more than 1.1% by weight and the manganese comprises more than 1.8% by weight;
        between about 0.4% by weight and 8.5% by weight of a sugar selected from the group consisting of high fructose corn syrup, glucose, sucrose and mixtures thereof
        between about 0.0006% by weight and 0.4% by weight of an organic complexing-matrix agent selected from humic acid, ulmic acid and mixtures thereof;
        between about 0.05% by weight and 0.4% by weight of fulvic acid;
        a preservative; and
        water; and
    curing the applied aqueous liquid whereupon color develops.

14. The method according to claim 13, wherein the step of applying comprises spraying the liquid onto the surfaces.

15. The method according to claim 14, further comprises heating the liquid to at least 110° F. prior to spraying.

16. The method according to claim 13, wherein the step of applying comprises dipping the surfaces into the liquid.

17. The method according to claim 16, further comprises heating the liquid to at least 110° F. prior to dipping.

18. The method according to claim 13, wherein the step of curing comprises placing the surfaces into an oven.

19. The method according to claim 18, wherein the oven temperature is at least 250° F.

\* \* \* \* \*